(12) United States Patent
Thorne et al.

(10) Patent No.: US 7,606,163 B2
(45) Date of Patent: Oct. 20, 2009

(54) SELECTIVE DELIVERY OF DATA

(75) Inventors: Nicholas D. L. Thorne, Southampton (GB); Christopher J. Bassett, Southampton (GB)

(73) Assignee: NXP B. V., Eindhoven (NL)

( * ) Notice: Subject to any disclaimer, the term of this patent is extended or adjusted under 35 U.S.C. 154(b) by 1071 days.

(21) Appl. No.: 09/925,357

(22) Filed: Aug. 9, 2001

(65) Prior Publication Data

US 2002/0021674 A1 Feb. 21, 2002

(30) Foreign Application Priority Data

Aug. 12, 2000 (GB) ................... 0019820.0

(51) Int. Cl.
*G06F 11/00* (2006.01)
*H04J 3/24* (2006.01)
*H04Q 7/20* (2006.01)

(52) U.S. Cl. .................. 370/252; 370/328; 370/426; 455/456.3

(58) Field of Classification Search ............... 370/312, 370/432, 278, 328, 475, 252; 455/456.1, 455/456.3, 456.6, 524, 3.1, 3.04, 2, 10, 6.2, 455/4.2, 5.1
See application file for complete search history.

(56) References Cited

U.S. PATENT DOCUMENTS 5,420,866 A * 5/1995 Wasilewski ................. 370/426
6,442,394 B1 * 8/2002 Valentine et al. ......... 455/456.3

FOREIGN PATENT DOCUMENTS

GB 2344009 A 5/2000
WO WO9966719 12/1999

OTHER PUBLICATIONS

TMV Compendium, Alert-C Coding Handbook, p. 1-89.
TPEG C++ Library Overview, Jan. 2000, BBC Research & Development.

* cited by examiner

*Primary Examiner*—Afsar M. Qureshi

(57) ABSTRACT

The delivery of data broadcast over a unidirectional communication data link is targeted at receivers having an environment exhibiting a specific characteristic by labelling the data prior to transmission with a status indicator that defines the characteristic that the local environment of the receiver (17) must possess as a precondition for receiving the data. Typical types of characteristics envisaged are the location of the receiver and the climatic condition of the receiver.

12 Claims, 3 Drawing Sheets

SELECTIVE DELIVERY OF DATA

The invention relates to a system for delivering to selected destinations data broadcast using unidirectional communication, and apparatus for use in such a system, and has particular, but not exclusive, application to targeted advertising.

There are several standards for transmitting carousels of data over a unidirectional radio link. Such carousels of data contain information that is available to any suitably equipped receiver on the system, and the receivers are able to select data from a carousel in response to user requirements. Typically the user will navigate through a menu structure to arrive at the required data. A carousel of data can contain any type of electronic object, for example text files, image files, audio visual stream files, events, and references to broadcast streams. The standards provide protocols for marshalling the data carousels into packets with labelling that allows the receivers to recreate the carousel without the need for any upstream communication. The labelling carries information such as file name, estimated time to receive the full object, whether the object is compressed or not, and type of error checking.

The data in the carousel may be geographically targeted by transmitting geographically tailored information on different transmitters in a network. This is provided in, for example, the Digital Audio Broadcast (DAB) standard. This method of targeting provides a coarse, regional targeting defined by the coverage areas of the transmitters.

Another form of targeting is provided by the RDS (Radio Data System) standard and is described in the document TMC Compendium, Alert-C Coding Handbook, Version F02.1, Jan. 2, 1999. In this case, information about traffic incidents, including their location, can be broadcast on a radio channel. Any RDS equipped receiver can decode all such traffic information, and may filter the information, for example based on receiver location, so that only relevant information is presented to the user. However, the targeting information transmitted, such as location, is a characteristic of the traffic incident, not of the receiving equipment, which may be different. Also, the transmitted information used for filtering, such as location, is presented to the user of the receiving equipment as the user generally needs to know such information about the traffic incident.

Targeting of data, even to individual receivers, can be provided if a bidirectional link is available, for example as with GSM mobile telephones, but there are many unidirectional systems in operation where an upstream channel is unavailable. Also, there are systems having a bidirectional communication capability where it is desirable to broadcast data using only unidirectional operation.

Furthermore, targeted delivery of broadcast data is desirable in cable networks.

An object of the invention is to provide improved targeting of data delivery using unidirectional communication.

The invention comprises unidirectional communication so can be implemented on a system which is equipped for only unidirectional communication, for example a TV network, but also can be implemented on a system which is equipped for bi-directional communication, for example a mobile phone network.

In the following description and claims the term "application" refers to any apparatus or software which stores, transmits, displays or processes the information content of the received data, or performs any combination of these actions.

In the following description and claims the term "status" refers to a characteristic of the environment, and the phrase "status of an application" refers to a characteristic of the environment of an application. Examples of status are location, a combination of location and rate of change of location, and one or more climatic conditions. When status is location, the location may comprise, for example, a predefined area or at least two co-ordinates.

According to one aspect of the invention there is provided a method for the selective delivery of data to an application by means of unidirectional communication, comprising associating with the data prior to transmission a status indicator, transmitting the data and status indicator, receiving the data and status indicator, ascertaining a present status of the application, comparing the ascertained present status with the status indicator, and enabling the application to read the data if the ascertained present status of the application is within the scope of the status defined by the status indicator and inhibiting the application from reading the data otherwise.

Prior to transmission the data is labelled with a status indicator which defines a status which must be a characteristic of the local environment of an application as a precondition for the application reading the data. After the data has been received, but before it is read by the application, a data filtering process is applied such that the data is read by the application only if the status defined by the status indicator is a characteristic of the local environment of the application. The filtering process comprises comparing a status of the application with the status defined by the status indicator. The status indicator is used for filtering and is not displayed to the user.

By this means there is control available, prior to transmission, over which applications may read the data. This control enables improved targeting of data delivery which enables new services to be provided over a unidirectional communication link. An additional benefit is that an application need not provide storage for data which is not relevant to it.

One example of the status of an application is its location. The location of an application may be ascertained by user input via a user interface, or by means of location measuring apparatus, such as a GPS receiver, if necessary in conjunction with a data base relating co-ordinates to location names.

By this means, for example, a fast food delivery company offering a nation wide but locally varying service can transmit on a national broadcast radio channel local menus selectively targeted at the delivery areas of its individual shops, without exposing users to menus that are unavailable to them. In this scenario the application could be an information browser for use in a home, and which receives data via a digital television receiver or a set top box.

By this means also, as another example, the licensing rights to specific broadcast information, such as a film which may be encrypted, may be restricted to a prescribed target area only. In this scenario the application could be a schedule of available films, and could be implemented within a digital television receiver.

A second example of the status of an application is climatic information which is characteristics of the environment of the application. The climatic information may be ascertained by means of a climatic sensor.

By this means, for example, an advertisement for cold drinks can be targeted at potential customers who are experiencing hot weather. As another example, advertisements for waterproof clothing can be targeted at potential customers who are experiencing rain, without annoying customers for which the advertisement has little relevance. In these scenarios the application could be a personal terminal supporting a weather forecasting service sponsored by advertisers.

A third example of the status of an application is a combination of the location and the rate of change of location of an application. The location and rate of change of location of an application can be ascertained by means of location and velocity measuring apparatus.

By this means, for example, road traffic in a particular area and travelling in a particular direction may be advised to take an evasive alternative route to minimize the impact of a traffic incident, without distracting unaffected travelers. In this scenario the application could be a travel information service implemented within a vehicular mounted radio terminal.

According to another aspect of the invention there is provided a communication system operating in accordance with the method described above, comprising means for associating with data prior to transmission a status indicator, means for transmitting the data and status indicator, means for receiving the data and status indicator, means for ascertaining a present status of an application, and means for comparing the ascertained present status with the status indicator and enabling the application to read the data if the ascertained present status of the application is within the scope of the status defined by the status indicator and inhibiting the application from reading the data otherwise.

According to another aspect of the invention there is provided encoding apparatus for use in a communication system such as described above, comprising means for associating with data prior to transmission a status indicator which defines a status to be used as a data filtering criterion, whereby an application may read the data only if the status of the application is within the scope of the status defined by the status indicator.

The status indicator associated with the data prior to transmission may be implemented by various methods. For example, the status indicator may comprise the following three fields: an indication of the type of status; an indication of the length of a status field; and a status field containing one or more values of the status. As another example, the status indicator may comprise at least a directory name; this method is described in detail below.

According to further aspect of the invention there is provided data filtering apparatus for use in a communication system such as described above, comprising means for comparing a present status of an application with a status indicator associated with transmitted data, and means for enabling the application to read the data if the present status of the application is within the scope of the status defined by the status indicator and inhibiting the application from reading the data otherwise.

According to a yet further aspect of the invention there is provided a receiving station for use in a communication system such as described above, comprising means for receiving data and a status indicator associated with the data, means for ascertaining a present status of an application, means for comparing the present status of the application with the status indicator, and means for enabling the application to read the data if the present status of the application is within the scope of the status defined by the status indicator and inhibiting the application from reading the data otherwise.

The means for ascertaining the present status of an application may be integral with the receiving station, or may be externally located, in which case the present status is reported to the receiving station. Similarly, the application may be integral with or external to the receiving station.

The invention will now be described, by way of example, with reference to the accompanying drawings wherein.

For clarity, the invention will be described first by way of an example embodiment for generic data and status information where the application is a terminal for an information and advertising service implemented in a radio receiving station, which may be for example a digital television receiver (possibly hand-held), a set top box or a video recorder, followed by elaboration of the embodiment for specific data and status information.

Figure 1:
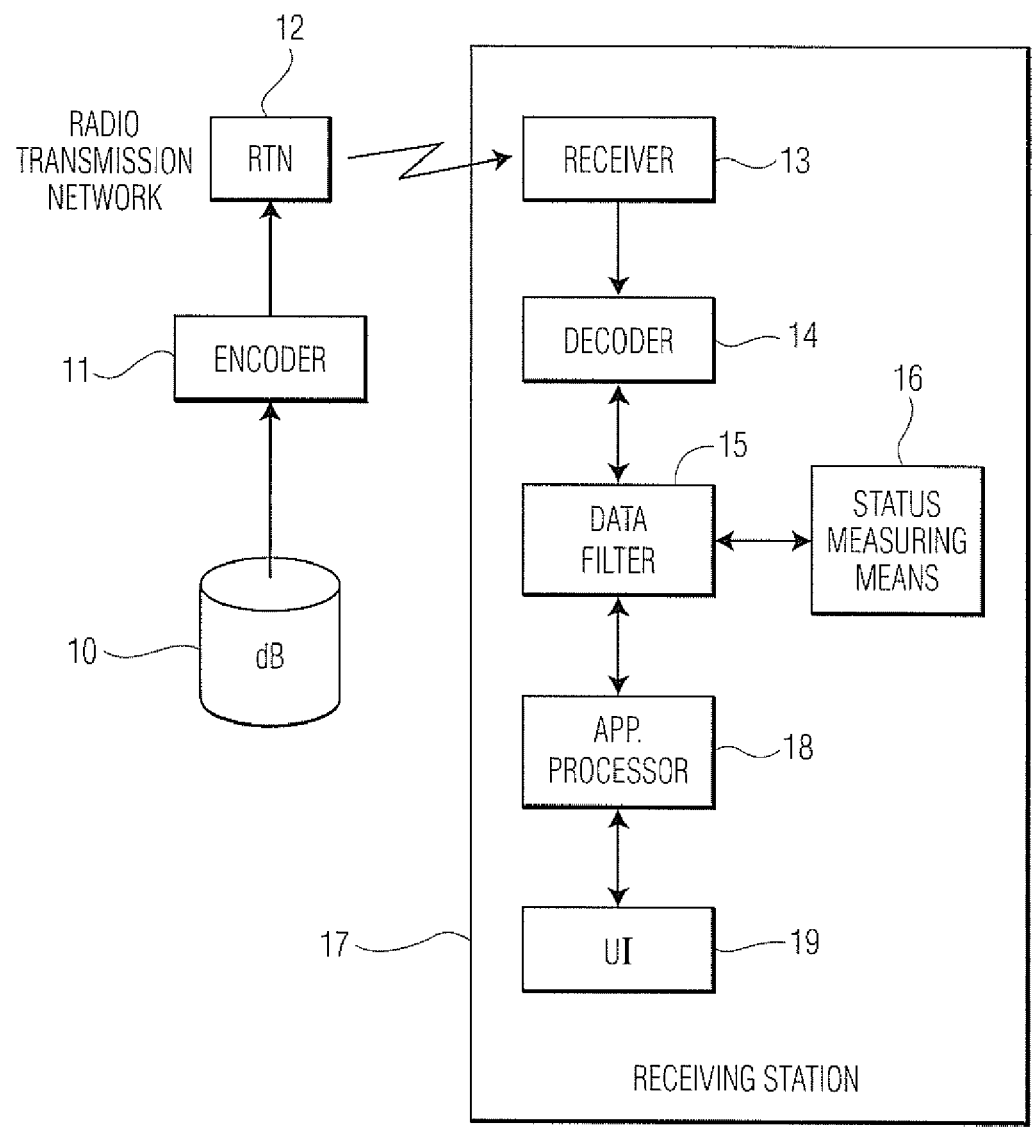
FIG. 1 is a block diagram of a system embodying the invention.

Referring to FIG. 1 there is a database 10 containing data and associated status information. The data and status information are routed to an encoder 11 which encodes the data and status information according to the DSM-CC protocol defined in ISO/IEC 13818-6:1998, thereby creating a status indicator associated with the data.

The DSM-CC standard supports the encoding of data in files according to a directory structure and an object carousel is implemented by encoding files and directories as objects within modules. The status indicator comprises at least a directory name; further details are described below.

The encoded data and status indicator are routed to a radio transmission network 12 where they are broadcast. Optionally the encoding apparatus may be integral with the transmission network.

The broadcast signals are received by a receiving station 17, which may be a portable equipment, comprising radio receiver 13, decoder 14, status measuring means 16, data filter 15, application processor 18 and user interface 19.

Radio signals received by the radio receiver 13 are routed to the decoder 14 which decodes the DSM-CC protocol, extracting data files and the directory structure from received modules. The data filter 15 controls which data is selectively routed from the decoder 14 to the application processor 18, the selection being determined on the basis of status. The status measuring apparatus 16 informs the data filter 15 of the present status of the application. The data filter compares the present status of the application with the status information associated with the data and, if the present status is within the scope of the status defined by the status indicator, enables the data to be routed from the decoder 14 to the application processor 18.

Data which the application processor 18 receives is presented to the user by means of a user interface 19. The status indicator is not presented to the user.

For elaboration of the embodiment described above, the invention will be described with reference to the following scenario of a pizza vendor who offers a take-out and home delivery service in the city of Southampton.

Figure 2:
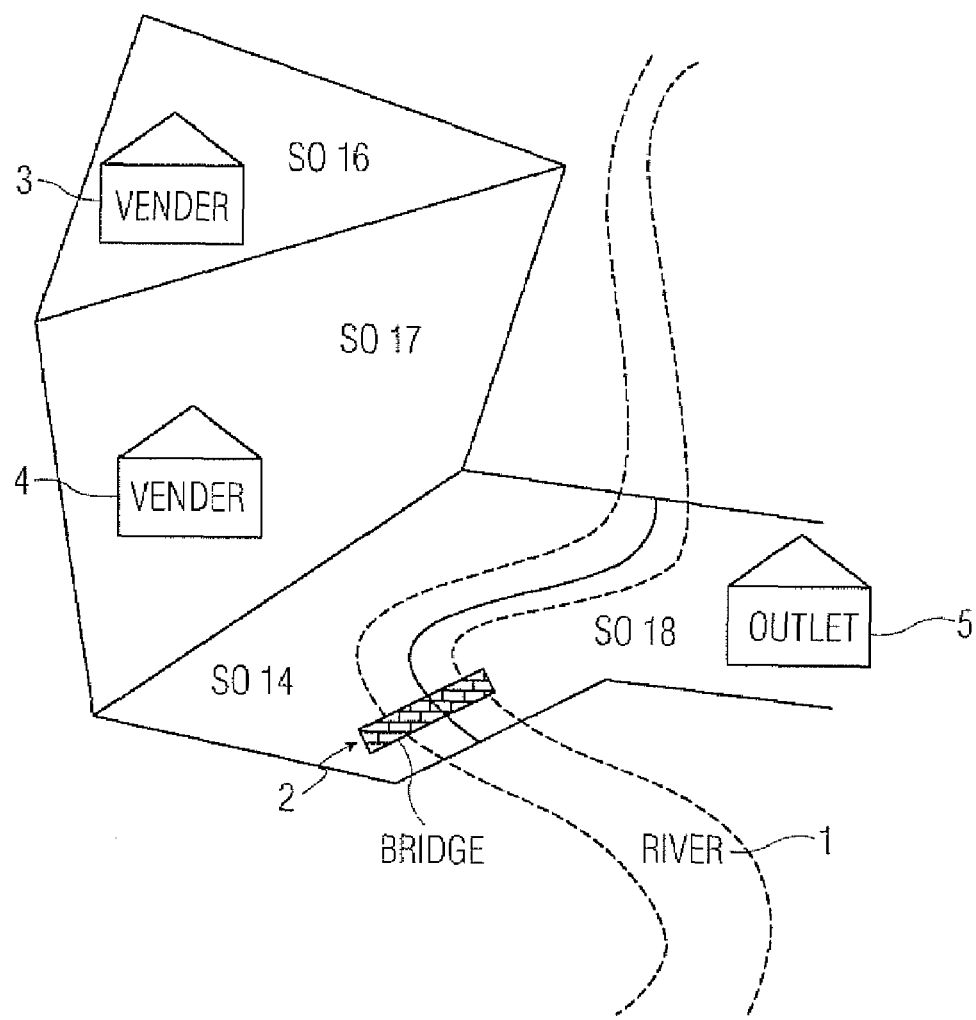
FIG. 2 is a city plan illustrating an application of the invention.

Referring to FIG. 2, the city is divided into four postal areas identified by means of post codes SO14, SO16, SO17 and SO18. The city centre is in area SO17. A river 1 flows along the boundary between areas SO14 and SO18 and across the river there is a toll bridge 2 which connects SO14 and SO18. The pizza vendor operates outlets 3, 4 and 5 in areas SO16, SO17 and SO18 respectively. The pizza vendor operates additional outlets across the country, so the pizza vendor chooses to advertise his menus on a national digital television channel. The pizza outlet 3 in area SO16 offers a standard menu. The pizza outlet 4 in area SO17 is a larger, inner city outlet and offers an extended menu. The pizza outlet 5 in area SO18 is in the suburbs and caters mainly for take-out orders, so offers a limited menu.

The pizza vendor wishes to advertise all of his menus but avoid advertising products to customers who are not able to buy those products in their local area. Therefore, the extended menu should be advertised in only area SO17, and customers in area SO18 should not be invited to order from the standard or extended menu because the additional cost of delivery across the toll bridge is not acceptable.

The elaboration of the embodiment will now be described with reference to the above scenario.

The data stored in the data base 10 are menus offered by the pizza vendor, and the associated status information comprises locations that the menus are applicable to, expressed as post codes. The data base also includes location independent information about the pizza vendor.

Figure 3:
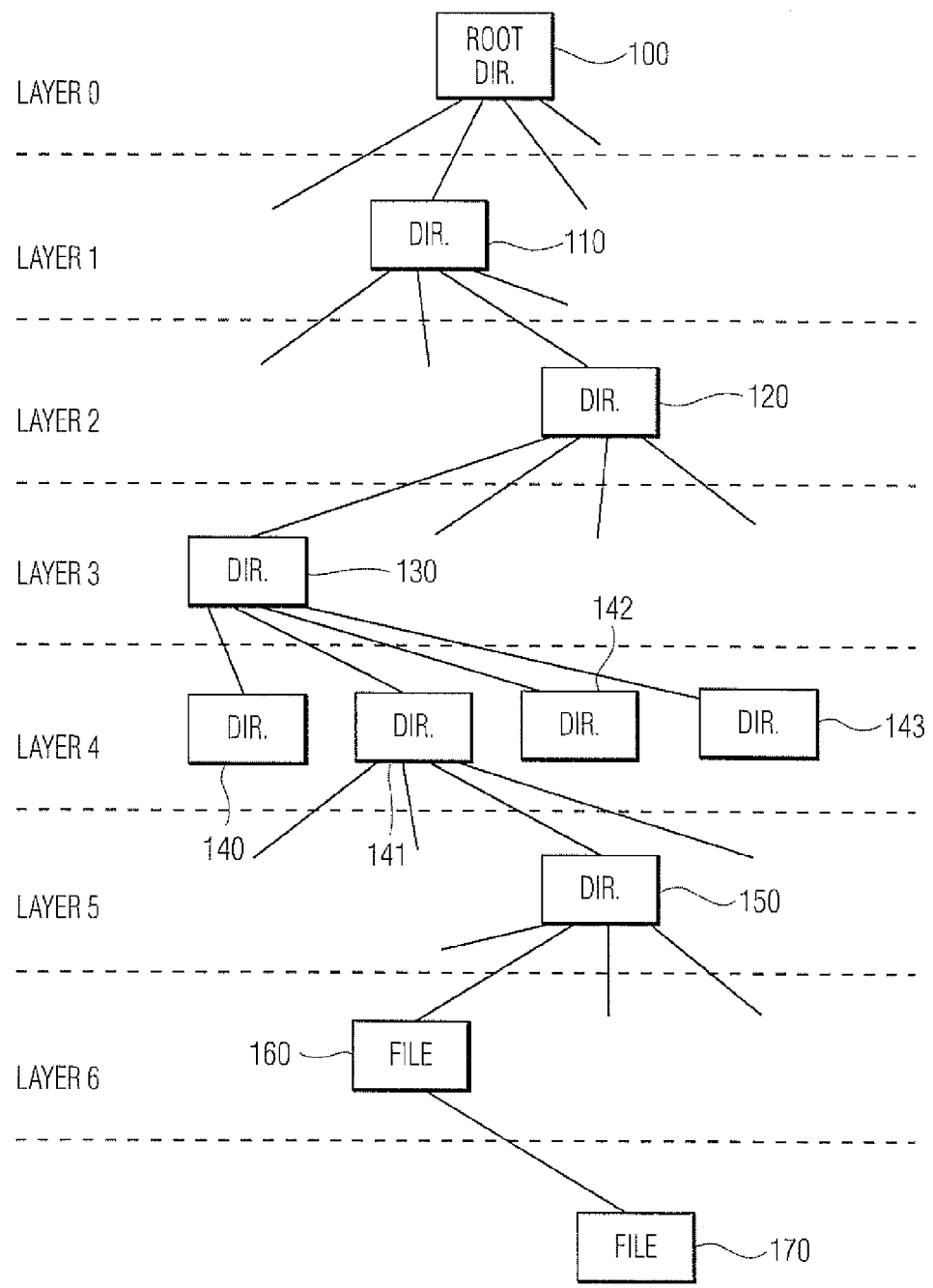
FIG. 3 is a diagram illustrating one method of implementing a status indicator.

The data and status information is encoded by the encoder 11 into a hierarchy of directories and files according to the DSM-CC standard. Referring to FIG. 3, there are six layers of directory and one layer of files relevant to the current scenario. In FIG. 3, for clarity, only an illustrative sub-set of directories and files are shown.

At layer 0 is the root directory 100 encompassing all status dependent data.

At layer 1 there is a directory for each type of status that can be used for data filtering. One directory 110 is the location directory.

At layer 2 there is an alphabetical set of directories for grouping cities alphabetically within each layer 1 directory. One directory 120 is the directory for city names commencing with the letter S.

At layer 3 there is a directory for each city having a name commencing with the letter S. One directory 130 is the directory for Southampton.

At layer 4 there is a directory for each postal area of Southampton, as defined by post (zip) codes. There are four directories 140, 141, 142 and 143 corresponding to areas SO14, SO16, SO17 and SO18 respectively.

At layer 5 there is a directory for each information topic that is available to users. One directory 150, for example, is the directory for take-out food shops in area SO16.

At layer 6 there are files for each take-out food shop in area SO16. One file 160 contains the menu our pizza vendor offers in area SO16. This file 160 also cross references a file 170 outside of the hierarchy of directories. File 170 contains status independent information about our pizza vendor, and may be cross referenced by directories related to any city or area.

In the current embodiment, the status indicator comprises the set of directory names at layers 0 to 4 which in combination point to the data relevant to a particular area.

Referring again to FIG. 1, the status measuring means 16 in this scenario is a GPS receiving device which informs the data filter 15 of the current location of the application implemented in the receiving station 17, and the receiving station 17 is, for example, a digital television receiver. The data filter 15 has a data base of post codes which it uses to translate GPS coordinates into post codes. The data filter 15 extracts from the broadcast data stream those files targeted at the current location, and location independent data, and makes the data contained within these files available to the application processor 18.

The application processor 18 stores the data for subsequent retrieval by the user, and formats the data for display to the user by means of the user interface 19. Data may be displayed immediately it is received, or display maybe deferred until the data is requested by the user. The status indicator is not presented to the user.

Optionally, the data filter 15 may defer extracting data from the broadcast data stream until the application makes a request for data. In this way data storage is reduced at the expense of increased access time.

In applications of the invention in which the status is location information, the status may be represented in any manner, including name of a building, name of a street, name of a pre-defined geographic, business or administrative area such as a park, a post (zip) code or city zone, two dimensional co-ordinates such as a grid reference, three dimensional coordinates such as GPS co-ordinates, or a set of co-ordinates defining a two dimensional area or three dimensional space.

In applications of the invention in which the status is climatic information, the status may be, for example, temperature, humidity, light strength, rainfall, seismic data or wind strength.

Optionally, protocols other than DSM-CC may be used for broadcasting data and characterizing status information, for example UHTTP.

Optionally, the flow of data from the decoder 14 to the application processor 18 may be controlled in different ways, dependent on the application. As a first example, data may be passed to the application processor 18 as soon as it becomes available off air. As a second example, the data may be stored by the decoder 14 or data filter 15 until the application requests the data; such a request may be initiated on start up of an application process, or by a user request. As a third example, all applicable status dependent information can be passed to the application processor 18 in response to a request from the user for any subset of the status dependent data; in the pizza vendor scenario, a request for pizza vendor data can result in the data for all take-out shops in the same area being passed to the application processor 18 so that the data is quickly available if the user requests any of that data. As a fourth example, a change of status can trigger the flow of up-to-date information from the decoder 14 to the application processor 18; in the pizza vendor example, menu information can be updated when a mobile receiver moves between areas.

Optionally, the status indicator may indicate a class of status such that any application whose present status is within the scope of the class is enabled to read the data. For example, a class may encompass a group of locations, and an application in any of the locations within the group is enabled to read the data.

Using directory structures as described in the pizza vendor scenario, a class of status may be indicated as follows. Suppose there is a single pizza menu applicable throughout Southampton. The layer 5 directories for take-out shops in each area would all point to the same layer 6 file which would contain the city-wide menu for our pizza vendor.

Optionally, data displayed or stored for subsequent retrieval may be erased, updated or overwritten if the present status of an application changes in such a way that a data filtering criterion of the displayed or stored data is no longer valid.

Although an embodiment of the invention has been described in which the status measuring means 16 is a GPS receiver for ascertaining location, other status measuring means may be used for ascertaining location, including, for example, input of post code or map co-ordinates via a user interface, or dead reckoning.

Although the invention has been described in relation to transmission over a digital television channel to a digital television receiver, the invention may be applied to other unidirectional radio links, including a unidirectional link on a system having bidirectional capability, and to other radio receiving equipment such as a set top box, video recorder or audio receiver.

Although a specific embodiment has been described which uses radio communication, the invention may be applied to systems which use cable communication.

Although the invention has been described in relation to advertising data, the invention may be applied to other types of data.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of data transmission and which may be used instead of or in addition to features already described herein.

The invention claimed is:

1. A method for the selective delivery of data to an application by means of unidirectional communication, comprising organizing the data in accordance with a hierarchical information structure and associating with the data prior to transmission multiple status indicators, transmitting the data and status indicators, receiving the data and status indicators, ascertaining a present status of the application, comparing the ascertained present status with the status indicators, and enabling the application to read a portion of the data if the ascertained present status of the application is within the scope of the status defined by the a status indicator associated with that portion of the data and inhibiting the application from reading the data otherwise.

2. A method as claimed in claim 1, in which the status indicator defines a location.

3. A method as claimed in claim 2, in which the location comprises at least two co-ordinates.

4. A method as claimed in claim 2, in which the location comprises a predefined area.

5. A method as claimed in claim 1, in which the status indicator defines a combination of location and rate of change of location.

6. A method as claimed in claim 1, in which the status indicator defines at least one climatic condition.

7. A method as claimed in claim 1, in which the status indicator comprises at least a directory name.

8. A communication system operating in accordance with the method claimed in any of claim 1, comprising means for associating with data prior to transmission a status indicator, means for transmitting the data and status indicator, means for receiving the data and status indicator, means for ascertaining a present status of an application, and means for comparing the ascertained present status with the status indicator and enabling the application to read the data if the ascertained present status of the application is within the scope of the status defined by the status indicator and inhibiting the application from reading the data otherwise.

9. Encoding apparatus for use in a communication system as claimed in claim 8, comprising means for associating with data prior to transmission a status indicator which defines a status to be used as a data filtering criterion, whereby an application may read the data only if the status of the application is within the scope of the status defined by the status indicator.

10. Data filtering apparatus for use in a communication system as claimed in claim 8, comprising means for comparing a present status of an application with a status indicator associated with transmitted data, and means for enabling the application to read the data if the present status of the application is within the scope of the status defined by the status indicator and inhibiting the application from reading the data otherwise.

11. A receiving station for use in a communication system as claimed in claim 8, comprising means for receiving data and a status indicator associated with the data, means for ascertaining a present status of an application, means for comparing the ascertained present status of the application with the status indicator, and means for enabling the application to read the data if the ascertained present status of the application is within the scope of the status defined by the status indicator and inhibiting the application from reading the data otherwise.

12. A receiving station as claimed in claim 11, in which the means for ascertaining a present status of an application is an input means for receiving information about the present status of the application.

* * * * *